3,448,038
METHOD AND APPARATUS FOR THE DEHYDRATION OF OIL
David B. Pall, Roslyn Estates, Klaus S. Feindler, Melville, and Arthur Vogel, Glen Cove, N.Y., assignors to Pall Corporation, Glen Cove, N.Y., a corporation of New York
Filed Mar. 15, 1966, Ser. No. 534,363
Int. Cl. B01d 47/14, 3/16
U.S. Cl. 208—187     16 Claims

ABSTRACT OF THE DISCLOSURE

A method and apparatus are provided for removing a first volatile liquid from a mixture of that liquid with a second less volatile liquid. This is accomplished in the instant process and apparatus by passing the mixture of first and second liquids through a column of packing material to form a thin film on the packing material. A stripping gas whose partial pressure of the first liquid is at least as low as the vapor pressure of the first liquid over the desired second liquid product is passed countercurrently through the column at a flow rate of at least about 2.5 cubic feet per minute per square foot of cross section of the column. The stripping gas takes up first liquid dispersed and dissolved in the second liquid, leaving the second liquid substantially free of first liquid.

---

This invention relates to a method and apparatus for the separation or removal of a volatile liquid from a less volatile, second liquid. Furthermore, this invention relates to a method and apparatus for the stripping, and particularly dehydration, of oil and, more particularly, to the removal of both dispersed water and dissolved water from oil.

Dry oil is an essential in many fields, and especially those fields in which hydraulic, lubricating and like oils are used, and where moisture dispersed or dissolved in such oils decreases hydraulic and lubricating properties of the oil and ultimately corrodes equipment. Where oil is used for dielectric purposes, as in transformers, for example, the water greatly reduces the insulating power of the oil.

Moisture or water dispersed in liquid hydrocarbons such as oil has been removed therefrom by one of several methods. For example, as described in U.S. Patent No. 3,096,380 to Bolen, moisture is removed from liquid hydrocarbons, such as cyclohexane, by countercurrently contacting the liquid to be dried with a partially dried light hydrocarbon gas as the dehydrating agent, in a packed drying tower. The light hydrocarbon gas removes only a portion of the water or moisture from the liquid. Thus, it is necessary to pass the partially dried liquid into a stripping column to remove substantially all the dehydrating agent therefrom, and thereafter pass said liquid through a bed of solid desiccant, such as bauxite, activated alumina, silica gel and the like, to remove what Bolen calls the final traces of moisture in the liquid hydrocarbon. However, solid desiccants remove moisture from liquid hydrocarbons only very slowly and the speed of passing the liquid through the bed imposes a limit on the capacity of the system. Solid desiccants have limited capacity for water, and from time to time require reactivation or regeneration. In addition, some liquids are absorbed or adsorbed on the desiccant, which complicates the regeneration.

In U.S. Patent No. 3,001,604 to Worley, water and light hydrocarbons are removed from a crude oil-water emulsion by intimately contacting the emulsion with a dried hydrocarbon gas. It is to be particularly noted that the water removed from the crude oil is only that water emulsified or colloidally dispersed in the oil. Moreover, Worley does not teach the removal of water or moisture which is dissolved in the crude oil.

Other methods which have been used to remove water from oil include merely heating the oil to a temperature sufficient to break a water-oil emulsion. In addition, air under high pressures or hot air has been blown through oil, heated or otherwise, or passed countercurrently therewith to remove water present in the oil. Each of the above mentioned systems has enjoyed some degree of commercial acceptance. However, these systems have had no success where it is desired to remove not only the water dispersed in the oil, but, in addition, the water dissolved in the oil. It appears that in each of these systems, the oil or other liquid and stripping gas do not come into the necessary degree of intimate contact with one another so that the stripping gas can remove both dispersed water and dissolved water from the oil or other liquid.

The instant invention quickly and thoroughly removes substantially all water dispersed and dissolved in oil, without contacting the oil with solid absorbents or adsorbents, and thus represents a major improvement over such prior art processes.

In accordance with the method of the instant invention, substantially all water dispersed and dissolved in a liquid is removed by spreading out the water and liquid into a plurality of thin films, so as to greatly increase the surface area of the water and liquid, disrupting and reforming the films with the aid of a stripping gas, whose partial pressure of water vapor is at least as low as the vapor pressure of water over the desired final liquid product, and countercurrently passing the gas against the films, thereby taking up the water both dispersed and dissolved in the liquid in said stripping gas. The stripped liquid is then recovered. The wet stripping gas can be discarded, or can be processed to lower its partial pressure of water vapor and thereafter reused.

In carrying out the method of the invention wherein the liquid to be treated is an oil, it is to be particularly noted that the oil to be stripped should be broken up and spread out into extremely thin films having a thickness of less than about 0.060 inch. In order to remove substantially all of the water from the oil, it is essential that hte stripping gas be passed countercurrently over and through the thin oil films at a high flow rate of at least about 2.5 and up to about 100 or more cubic feet per minute per square foot of cross section in which disrupting and reforming of films takes place. Accordingly, the ratio of the flow rate of the stripping gas countercurrently to the flow rate of the oil, $$\frac{\text{flow rate of gas}}{\text{flow rate of oil}}$$

should be within the range from about 4 to about 100 and preferably should be from about 8 to about 25. The oil flow rate should be within the range from about 0.25 to about 7.5 cubic feet per minute per square foot of cross section in which disrupting and reforming of films takes place. The above parameters apply to oils having a viscosity below about 200 cp. under the stripping conditions. The higher flow rates are preferred for the less viscous oils.

It is to be understood that the method of the instant invention can be employed in separating or removing any first liquid which is dissolved, or dispersed and dissolved in any second liquid which is less volatile than the first liquid.

If a conventional stripping apparatus were employed, it could not permit such high gas flow rates. Indeed, in many cased, in dehydrating oil using the method of the instant invention, it has been found that when the required high flow rates of stripping gas are used in conventional apparatus, a large portion of the oil to be stripped becomes gas-borne in and is blown out of the apparatus with the stripping gas. Therefore, apparatus suitable for use in carrying out the method of the instant invention in removing a first liquid from a second, less volatile liquid, must ensure not only the formation of a plurality of thin films of the mixed first and second liquids, the disruption of the thin films and the subsequent continual reformation and disruption of the films so that a maximum surface area of the mixed first and second liquids is available for intimate contact with the stripping gas, but also must permit the flow of stripping gas therethrough under the required high flow rates without the second, less volatile, liquid becoming gas-borne therein.

A stripping apparatus has been developed in accordance with the invention which is especially adapted for use with the method of the invention in removing both dispersed and dissolved liquids, such as water, from an oil. Such apparatus comprises a stripper column; an inlet for oil containing water and an outlet for stripped oil for said stripper column; a stripping zone within said stripper column; means to feed oil containing water into the stripping zone in the forh of at least one or more thick, heavy oil streams, and which can flow through rising stripping agent under high flow rates, without being disrupted by said agent; packing material in said stripping zone; and a stripping agent inlet and a stripping agent outlet for said column.

The oil inlet through which oil containing both dispersed water and dissolved water is fed into the column is preferably located above the stripping zone and in communication with means to feed oil containing water into the stripping zone (referred to also as oil feed means). The oil outlet is preferably located below the stripping zone and in close proximity to the bottom of the column.

The means to feed oil containing water into the stripping zone is all-important in enabling introduction of oil without its becoming gas-borne. It is positioned within the column, preferably above the stripping zone, and aids in uniformly distributing oil into the stripping zone. It is essential that oil and water entering the stripper column through the oil inlet be converted by the oil feed means into the form of a plurality of thick, heavy streams of oil and water which can flow against the rising stripping agent or gas into the stripping zone, without becoming gas-borne in the gas flow emerging from the stripping zone.

Accordingly, such oil feed means can take the form of a container having openings or channels of a predetermined sufficiently large diameter, and having sides of such a height and cross sectional area as to retain the oil at a level in the container to provide a head of pressure sufficient to force the oil to enter the stripping zone at a predetermined pressure and flow rate so that the oil enters the stripping zone in the form of a plurality of relatively uniform, thick, heavy streams resistant to disruption by the countercurrent flow of stripping gas. Thus, the container can have a bottom portion containing holes of a sufficiently large diameter. Each hole, if desired, can be provided with an overflow tube which extends above and also, if desired, below the bottom of the container. In this manner, the holes at the bottom of the container are resistant to cloggings by solid contaminants and oil will fill the container to a depth equal to about the height of the overflow tube. Additionally, by extending below the bottom of the container, the overflow tube precludes the recombination of the various streams into a single stream. Alternatively, the oil feed means can take the form of a weir, or a plurality of weirs, each provided with notches of desired configuration, such as a V-shape. Wet oil entering the weir builds up until a sufficient level is obtained to provide a head sufficient to force oil through all the notches and into the stripping zone. The top of the container can be provided with a mesh-like cover which helps keep splashing oil from leaving the container and becoming gas-borne.

The stripping zone within the stripper column is comprised of an open area filled with packing or contact surface supplying materials. The packing material must be able to disrupt, break up, and spread out the thick heavy oil-water streams into a plurality of very thin films which always trickle down over the packing material, and in doing so, the films are always reforming and changing course, thereby exposing a maximum oil surface area for intimate contact between the oil and stripping gas. The packing material must contain a large surface area of at least about 50 square feet of surface area per cubic foot of packing and preferably 80 or more square feet, at least 10,000, and preferably 30,000 or more interstitial holdup points per cubic foot of packing, and at least 50% open area or free volume, and preferably 85% or more free volume through which stripping agent of gas can flow, to intimately contact and disrupt any thin oil films that form on or between packing material. Such packing material can take the form of helices, springs, rings, helices in ring form such as Tellerettes, and the like. In order to ensure that substantially all of the liquid to be stripped comes into contact with, and is disrupted by the packing material, the ratio of the significant dimension of the packing, such as the diameter or length of the packing, to the diameter or the stripper column should be within the range from about $\frac{1}{64}$ to about $\frac{1}{4}$, and should preferably be less than about $\frac{1}{6}$.

The stripping agent inlet and outlet are located near the bottom and top of the stripping zone, respectively, so that countercurrent flow of the stripping agent with respect to the oil within the packed stripping zone can be maintained.

In using the stripping apparatus of the instant invention, oil containing both dispersed water and dissolved water is fed into the stripping column via the oil inlet, and into the oil feed means. The oil leaves the oil feed means in the form of a plurality of thick heavy streams of oil which enter the packed stripping zone of the column without being disrupted or broken up by the upward flow of stripping gas. Upon entering the packed stripping zone, the oil streams are disrupted and spread out by the packing material to form a very large number of thin oil films. The thin oil films are in contact with the packing material as they trickle down a devious route through said packing always changing course so as to expose a maximum surface area of the oil. The stripping gas, for example air having a partial pressure of water vapor at least as low as the vapor pressure of water over the desired final stripped oil product, is fed through the stripping gas inlet into a lower portion of the column, preferably below the stripping zone. The air is passed countercurrently to the falling oil in the packed stripping zone and is forced over and through the packing material and the thin oil films, thereby further disrupting and spreading out the oil films and taking up dispersed water and dissolved water from the oil. The stripped oil flows down out of the stripping zone and out of the column via the oil outlet.

If desired, the instant apparatus can be operated as a batch system and the stripped oil circulated through the stripping zone more than once to ensure a substantially complete removal of the water from the oil. The apparatus can also be operated as a continuous system with a portion of the stripped oil being recirculated, and a portion being collected and an equivalent portion of oil containing both dispersed water and dissolved water being fed into the column as make up for the collected oil. The number of recycles needed to ensure a substantially complete stripping of the oil will depend upon the moisture content of the oil, the type and condition of the stripping gas, the flow rates of oil and stripping gas into the column, the structure and capacity of the stripping zone used, and the degree of stripping of the oil desired.

The stripping gas to be used in the method and with the apparatus of the invention can be any inert gas, or liquid which, under the existing stripping conditions, is an inert gas, that is, a gas which is unreactive with and substantially insoluble in the oil to be stripped or other liquid to be treated and which is capable of taking up, sorbing or extracting water vapor from the oil, or any volatile liquid from the other liquid to be treated without imparting deleterious effects to the oil or the other liquid. Such gases which are suitable for use in removing water both dispersed and dissolved in an oil include, but are not limited to, air, nitrogen, hydrogen, carbon dioxide, hydrocarbon gases such as methane, ethane, ethylene, liquids such as methanol, ethanol, tert-butyl alcohol, and other liquid hydrocarbons which are in a gaseous state under operating conditions of the invention.

Liquids of any type can be treated using the method and apparatus of the instant invention, provided the liquid is less volatile than the liquid which is to be separated or removed therefrom. Liquids which can be stripped and especially, dehydrated, using the present system include oils used as dielectrics, hydraulic fluids, lubrication, fuels, and like applications, and include any oil which is a liquid at temperatures below 100° C. Examples of such oils include fixed oils such as animal and vegetable oils, triglyceride esters of fatty acids, mineral oils, fuel oils and lubricating oils derived from petroleum and its products, silicone oils, polyethylene glycols, Arochlors, and the like.

The oil to be stripped or dehydrated can be part of an oil system in vehicles such as submarines, airplanes, missiles, rockets, or the like. While these vehicles are in use, the oil cannot feasibly be piped into a separate oil dehydration system apart from the vehicles. Accordingly, the instant apparatus can be made in a compact size, but in a sufficient size to accomodate the high rate of flow of stripping gas required, and can be incorporated directly into the oil system of the vehicle. Thus, oil containing both dispersed water and dissolved water can be dehydrated in situ and recirculated back through the system without ever leaving the vehicle.

In carrying out the instant invention, stripping gas must be maintained so that its partial pressure of water vapor is at least as low as the vapor pressure of the water over the desired finished dehydrated product. This can be accomplished by many different methods. The stripping gas can be passed through a compressor and thereafter through a gas dryer which reduces the partial pressure of water vapor in the gas. Typical gas dryers suitable for use herein include, for example, those of the heatless variety, such as described in U.S. Patents 2,944,627, 3,104,162 and 3,069,830. Furthermore, a vacuum pump can be employed to reduce the pressure at the gas outlet and consequently to reduce the pressure in the stripping zone, thereby causing a reduction in the partial pressure of water vapor in the influent stripping gas. In addition, the use of the vacuum pump facilitates the withdrawal of the wet gas from the stripping zone, and the entrance of dry stripping gas into the stripping zone. Where a vacuum pump is employed to reduce the partial pressure of water vapor in the stripping gas, the total pressure in the stripping zone should be maintained so as to be greater than the vapor pressure of water over the oil under stripping conditions. This will ensure that the water contained in the streams and in the thin films of oil will not boil carrying oil with it, and thereby cause a loss of oil with the effluent gases. Further, by maintaining the pressure in the dehydration zone above the vapor pressure of water over the oil, the criticality of any leaks which might develop in the system will be lessened, and the size of the vacuum pump needed will be greatly reduced. The use of such a system requires no special treatment of the stripping gas. Normally, if air is used as the stripping gas, the reduced pressure in the column will ensure that the partial pressure of water vapor in the air is kept below the vapor pressure of water over the oil.

Where a vacuum pump is employed, the present method can be conveniently carried out in an open or closed system. When a closed system is used, it would be efficient to utilize a gas other than air. Thus, for example, substantially moisture-free gases such as ethylene, methane, ethane, nitrogen, hydrogen, and the like can be profitably employed herein. After the stripping is completed, such gas can be drawn from the stripping zone by means of the vacuum pump, passed through conventional gas drying equipment, such as a heated dryer in combination with a blower, to lower its partial pressure of water, and thereafter recirculated through the stripping zone.

The instant invention can be advantageously modified by heating the oil containing dispersed water and dissolved water to a temperature below the boiling point of water prior to or during the stripping step, thereby even further increasing the oil stripping potential of the system by ensuring the existence of a large pressure gradient between the partial pressure of water vapor in the stripping gas and the vapor pressure of the water in the oil. This can be accomplished for example, by passing the oil to be stripped through a heat exchanger to raise its temperature to a predetermined point below the boiling point of water. In addition, the stripping gas can be heated to a temperature below the boiling point of water to further enhance the stripping potential of the system and, if desired, the heated stripping gas can be used to heat the oil to be stripped.

The apparatus of the invention can be modified by including within the stripping zone means to direct the thin oil films in the stripping zone away from the inner walls of the stripper column and into the central portion of the stripping zone and thus reduce the amount of oil running down the inner walls of the column. This ensures that substantially all of the oil will be formed into thin films in the packed zone, and will be disrupted by and intimately mixed with the packing material and the stripping gas. The oil directing means can take the form of a dished shaped annulus attached to the inner walls of the column and extending downwardly and away from the inner walls. The annulus should preferably have a span from the outer wall to the central opening within the range from about 0.18 to about 0.61 times the square root of the diameter of the column in inches and preferably, is about 0.40 times the square root of the diameter of the column. Thus, for a column having a diameter of 6 inches, each annulus has a span within the range from about 0.5 to about 1.5 inches, and preferably is about 1 inch. Where more than one dished shaped annulus is employed, the spacing of the annulus is proportional to the diameter of the column, $d$. They should be spaced in a ratio ($s$ (spacing) :$d$ (diameter)) of from about 1.1 to 3:1.

In addition, means to direct and substantially uniformly distribute stripping gas into the stripping zone and to prevent oil from entering the stripping gas inlet may be included within the stripper column. Such gas distribution means preferably is comprised of a dished annular ring having a U-shaped cross section, the legs of the U extending downwardly. The gas distribution means is secured to the inner walls of the column in close proximity to and extending downwardly over the stripping gas inlet which has an orifice diameter within the range from about 0.01 $d$ to about 0.7 $h$, where $d$ is the diameter of the column and $h$, the height of the legs of the U-shaped gas distribution means, is within the range from about 0.04 $d$ to about 0.2 $d$, and the distance between the legs is within the range from about 0.01 $d$ to about 0.06 $d$. The inner periphery of the dished annular ring extends below the gas inlet and at a distance from the inner walls of the column equal to about 0.01 to about 0.06 $d$. The dished annular ring must have a large central opening within the range from about 0.8 to about 0.98 $d$ to accommodate the high flow rate of stripping gas passing up through the central opening into the zone. Thus, for a 6 inch column the central opening of the annular ring is within the range from about 5¾ to about 5 inches. The stripping gas entering the column flows along the sides of the annular ring, around the inner periphery thereof, and is rotated at an angle of about 180° by the annular ring so that it can flow up through the central portion thereof and into the stripping zone.

In addition, the gas distribution means can take the form of a container having a plurality of risers protruding therefrom into the lower portion of the packed bed. Accordingly, stripping gas entering the tower through the distribution container enters the stripping zone through the risers, the risers preventing oil from flowing into the distribution container.

The instant invention can be further modified by employing a filter within the stripper column below the stripping zone and before the oil outlet. Accordingly, oil which has already passed through the stripping zone passes through the filter prior to leaving the column, thereby removing large bubbles of stripping gas, particles of solids, and globules of water entrained in the dehydrated oil. Such a filter is especially useful for filtering dehydrated oil which contains solids, such as sodium chloride and other salts, which were in admixture or solution with the water dispersed and dissolved in the oil prior to dehydration of the oil. The filter can take the form of a mesh screen having a pore size from about 50 to about 300 microns and depending upon the medium to be filtered can be made of steel, monel, nickel, copper, brass, bronze, aluminum or the like.

If desired, the oil can be collected in the portion of the column below the stripping zone which defines a sump for oil. The fine mesh screen type filter is interposed in the sump before the oil outlet. Any gas still remaining in the collected oil is allowed to rise to the surface of the oil, and pass from the oil through the packing and subsequently out of the column. In order to ensure that the gas rising from the surface of the oil may pass from the oil and that all oil is filtered prior to leaving the sump through the oil outlet, means such as conventional risers attached to a foraminous or slotted plate can be positioned above and in close proximity to the oil sump, the foraminous or slotted plate serving as a cover for the top end of the screen type filter, and the sides of the filter containing the filtering elements. The risers can take the form of a circular cap inverted over a vapor tube of smaller diameter than the cap, each tube of which is in communication with a hole or slot in the plate. Accordingly, oil falling from the dehydration zone passes through the filter and then is collected in the oil sump below the foraminous plate supporting the risers, while gas entrained in the collected oil rises through the slots in the plate, through the riser and into the packed zone.

Oil level control means can be positioned within the oil sump in order to adjust and control the level of oil in the oil sump and the flow of stripped oil out of the sump. Such oil level control means can take the form of conventional oil level responsive devices wherein a magnet is used to actuate a signal such as a switch, indicating a change in condition of the liquid level or flow and the signal, in turn, actuates another magnet or mechanical device which uncovers the oil outlet orifice within the sump when the oil level rises to a predetermined point, and which covers the orifice when the level falls to a predetermined point.

In addition, the oil level control device can take the form of a float operated valve in which a float, in communication with an oil outlet valve, is positioned in the oil sump. When the level of oil in the sump reaches a pretetermined point, the valve is closed.

In another useful modification of the instant invention, oil, after it has left the stripper column, is filtered to remove smaller particles of solids, globules of liquid, and bubbles of stripping gas, which were not removed in the column. It is quite beneficial to regulate oil flow through the filter employed outside the column so that a portion of the oil flows through the filter, depositing solids, moisture, stripping gas, air and other foreign substances on the filter element, and the remainder of the oil, which could comprise up to about one-half or more of the oil from the stripper column, flows around and in contact with, but not through the filter element, thereby collecting the foreign substances deposited on the filter element and thereafter is recirculated back to the column for further stripping and refinement. Air and other gases dissolved or entrained in the oil will, for the most part, be recycled back to the column with the oil rather than passed through the filter with the oil recovered, since the return path to the column offers substantially less resistance to the air than the path through the filter. Accordingly, filter operation can be continuously carried out, keeping shut-down time needed to clean the filter element to a minimum and the oil recovered should be substantially free of air and other gases. A minimum oil flow through the column, regardless of the oil input can thus be maintained at all times.

Typical filters which can be employed herein externally to the stripper column include, but are not limited to, those described in U.S. Patents Nos. 2,925,650, 3,150,532 and pending patent application, Ser. No. 98,595, filed Mar. 27, 1961.

Where more than one filter is employed, for example, one within and another outside the column, the filter within the column preferably should contain a relatively coarse filter element as compared with the filter element of the external filter. Accordingly, the internal filter should function as a coarse filter removing large solid particles, gas bubbles, and liquid globules, while the external filter functions as a fine filter, removing substantially all remaining solids, liquids and gases from the oil.

Under the stripping conditions employed in the invention, many of the stripping gas-oil mixtures which could be present in the stripping system could be combustible. Accordingly, the use of electrical components in the system should be kept to a minimum, when such combustible mixtures are present. For example, mechanical valving should be employed in the system, in lieu of solenoid valving.

The method and apparatus of the instant invention is more specifically described with reference to the accompanying drawings which illustrate preferred embodiments of the instant invention, and in which.

Figure 1:
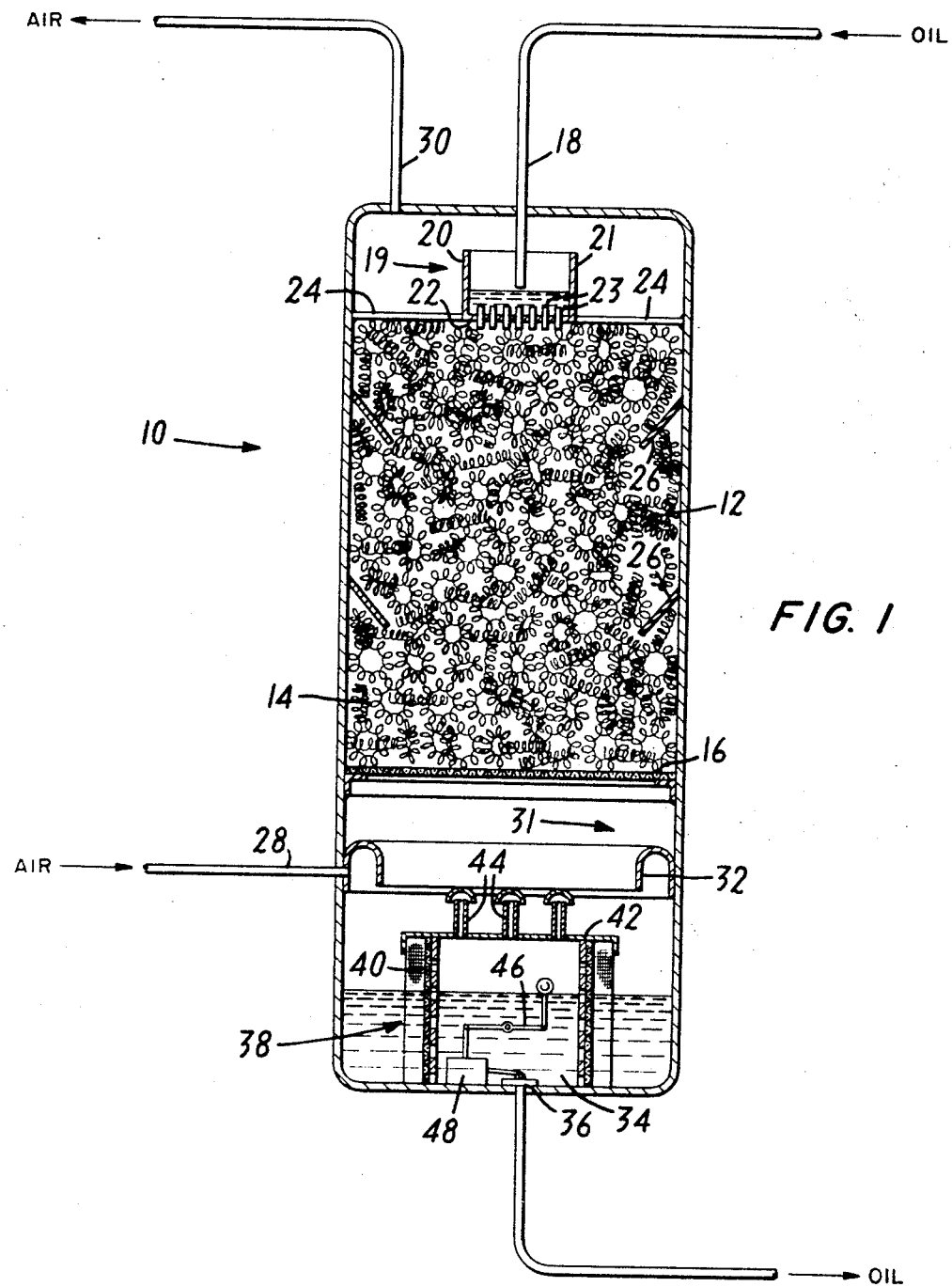
FIGURE 1 is a schematic drawing of a preferred embodiment of a stripper column of the instant invention.

The stripper column of FIGURE 1 generally referred to by the numeral 10, has a stripping zone, indicated broadly by the numeral 12, containing packing material 14 in the form of a plurality of plastic helices formed in a ring having a diameter of about 1 inch, containing about 90 square feet of surface area per cubic foot of packing, about 90% open area, and about 35,000 interstitial holdup points per cubic foot of packing and known commercially as Tellerettes, the packing being supported by foraminous screen 16. The upper part of the column is provided with an oil (containing water) inlet line 18. Means to feed the oil into the stripping zone in the form of a plurality of thick heavy oil streams which can flow against rising stripping gas without being disrupted by the gas (and which also is referred to as oil feed means), generally referred to by the numeral 19, is in the form of a container 20 fashioned with a foraminous bottom plate 22 positioned below the oil feed line 18, and is secured to the column by means of supports 24 which are welded to the container 20 and column. The holes in the bottom plate 22 are provided with overflow tubes 23. The height of the sides 21 of the container 20 and the size of the holes in the bottom plate 22 are designed and the flow rate of oil into the container is adjusted so that a level of oil is always maintained in the container sufficient to provide a head of pressure to ensure the formation of oil streams that can resist disruption by the countercurrent flow of stripping gas from the stripping zone.

The stripping section of the column is provided with a plurality of oil direction means 26 in the form of a plurality of spaced apart dished shaped annuluses, each of which is secured to the inner walls of the column, and extends downwardly away from the inner walls of the column, and thereby is able to direct the flow of oil films toward the center of the stripping zone. Stripping gas inlet 28 is located below the stripping zone, and stripping gas outlet 30 is located above the stripping zone. Stripping gas distribution means generally referred to as 31 in the form of an annular distributor 32 having an inverted U-shaped cross-section is fastened to the inner walls of the column and is positioned so that its outer periphery is against the inner walls of the column, above the stripping gas inlet, and its inner periphery extends below the gas inlet and away from the inner walls of the column. Annular distributor 32 directs incoming stripping gas into the central lower portion of the stripping zone. The lower portion of the column below the packing support screen 16 defines an oil sump 34 for collection of oil. Oil outlet 36 is positioned within oil sump 34. Positioned within the oil sump 34 is a filter generally referred to as 38, containing a mesh screen filtering element 40 which encircles oil outlet 36, thereby ensuring that all oil flowing out of the column first passes through filtering element 40. A foraminous plate 42 defines a top cover for the filter 38. A plurality of risers 44 are affixed to the filter cover or plate 42, one riser over each hole in the plate, so that the risers 44 are in direct communication with the oil sump. The plate 42 and risers 44 ensure that gas entrained in the oil collected in the sump will be permitted to rise into the stripping zone without allowing unfiltered stripped oil to enter sump 34. Conventional oil level control means 46 is positioned within the sump 34. Thus, when the oil in the sump reaches a predetermined level, a magnetic device within housing 48 of oil level control means 46 actuates a signal which in turn activates a mechanical device or another magnet which opens oil outlet 36 and thereby allows oil to flow from the sump and out of the column.

The stripping column of FIGURE 1 operates as follows. Oil containing both dispersed water and dissolved water is continually fed through oil inlet 18 into container 20 of oil feed means 19 wherein the oil builds up and maintains a high level in the container and thus despite variations in inlet flow exerts a consistent pressure against the bottom plate 22. The oil passes through the bottom plate 22 of the container 20 in the form of a plurality of relatively uniform thick, heavy oil streams, into the packed stripping zone 12. Upon contacting the packing, the oil streams are disrupted, broken up, and spread out into a large number of thin oil films, which trickle down the packing, and reform as they flow down along a devious, ever changing course, so that a maximum surface area of the films are exposed for drying. The oil films are directed away from the inner walls of the column and towards the center of the stripping zone by oil directing means 26. Air, having a partial pressure of water vapor at least as low as the vapor pressure of the water over the desired final dehydrated oil product, is fed as the stripping gas at a rate about 8 to about 25 times as great as the flow rate of oil, into the column through gas inlet 28, and is directed by the gas distribution means 31 into the lower central portion of the packed stripping zone. Upon entering the packed stripping zone, the air comes into intimate contact with and disrupts the falling thin oil films. The high pressure gradient between the partial pressure of water vapor in the air and the vapor pressure of the water over the oil causes the water both dispersed and dissolved in the oil to volatilize and be taken up by the air. The wet air then leaves the column through gas outlet 30. The dehydrated oil flows to the bottom of the column and into sump 34, wherein it is filtered by means of mesh screen 40, and thereafter flows out of the column through outlet 36, as controlled by oil level control means 46.

As the oil flows down the column, water is gradually removed therefrom by the air. By the time the oil is at the bottom portion of the stripping zone, a good deal of the water has already been removed from the oil. Intimate contact at the bottom of the stripping zone between the relatively dry air and the relatively dry oil causes the remainder of the water dispersed and dissolved in the oil to volatilize from the oil and be taken up by the air.

Figure 2:
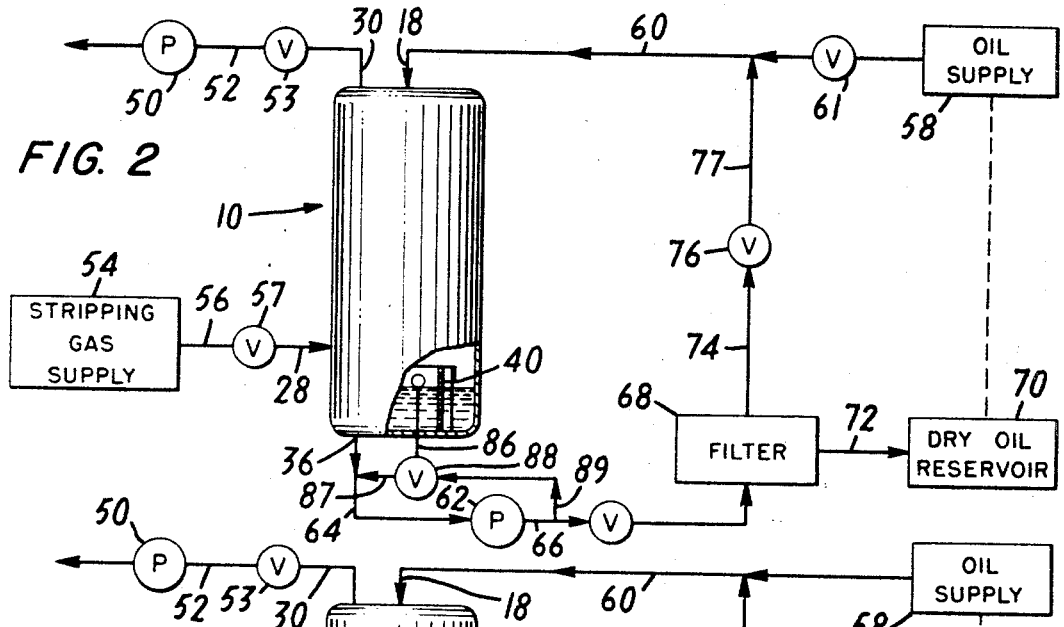
FIGURE 2 is a schematic drawing of a preferred embodiment of the instant invention incorporating a stripper column similar to that shown in FIGURE 1, a vacuum pump at its stripping gas outlet, and a pump at its oil outlet in communication with a filter external to the stripper column.

A preferred embodiment of the invention is shown in FIGURE 2, wherein a vacuum pump 50 is connected to gas outlet 30 by means of pipe 52 containing valve 53, and a source of stripping gas 54 is connected to stripping gas inlet 28 by means of pipe 56 containing valve 57. An oil supply 58 is connected to oil inlet 18 by means of pipe 60 which contains regulating valve 61 and oil outlet 36 is connected to the inlet of pump 62 by means of pipe 64. Pipe 66 is in communication with the filter 68, which in turn is in communication with dry oil reservoir 70 by means of pipe 72. Pipe 74 attached to regulating valve 76 is in communication with filter 68 and pipe 60 by means of pipe 77. In addition, a second oil level control means 86 is positioned within the sump 34 in communication with oil outlet line 64 and oil line 66 which is at the pump outlet, by means of lines 87 and 89, respectively. The second oil level control means ensures that the oil level in the sump is maintained at a constant level, so that air bubbles do not enter pump 62. Thus, when the oil level drops to a predetermined level, oil level control means 86 opens valve 88, thereby allowing pumped dry oil to recirculate back through pump 62. The second oil level control means and control valve 88 can take the form of a float operated valve as described hereinbefore.

In carrying out the instant invention, using the apparatus as shown in FIGURE 2, vacuum pump 50 reduces the pressure in the stripping zone just above the vapor pressure of the water over the oil to be stripped. The use of a vacuum pump to reduce the pressure within the column ensures that the partial pressure of water vapor in the air is kept well below the vapor pressure of water above the oil to be stripped, and accordingly, no special pre-treatment need be performed on the air. However, as stated hereinbefore, the total pressure within the column must be maintained so as to be greater than the vapor pressure of water over the oil to be dehydrated, so that the water cannot boil off from the oil carrying oil with it. The stripper column is otherwise operated in the same manner as described hereinbefore to produce stripped oil. The wet air produced is drawn out of the stripping zone through gas outlet 30 by means of the vacuum pump 50. The stripped oil flows to the bottom of the column through coarse filter 38 into sump 34, exits at an oil outlet 36, and is pumped by means of pump 62 through filter 68 which removes small particles of solids, globules of water or bubbles of air that were not removed by the coarse filter 38. A portion of the oil is used to clean the filter element and thus is recycled back to the column through line 74, valve 76, line 77, and line 60, while the remainder of the oil is filtered and thereafter flows through line 72, into an oil reservoir 70, which could be a transformer, a transmission system or the like. Valve 76 and 61 are control valves and are used to help maintain a minimum oil flow rate of dried oil to the oil reservoir, regardless of the cake build-up on the filter element.

Figure 3:
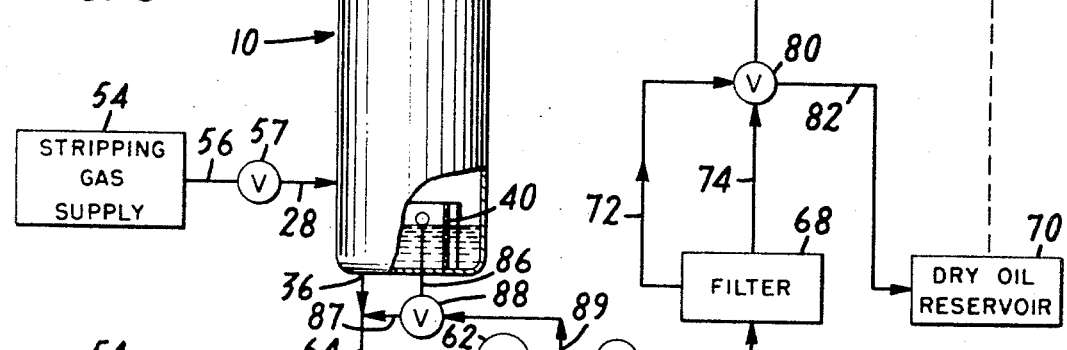
FIGURE 3 is a schematic drawing of another preferred embodiment of the invention which is a variation of the embodiment of FIGURE 2 containing flow control valves to control oil flow into the column.

FIGURE 3 is a modification of the apparatus as shown in FIGURE 2, wherein a four-way control valve 80 is employed in place of control valves 76 and 61. Line 72 is in communication with an inlet of one passageway through four-way valve 80. The outlet of the passageway is in communication with oil reservoir 70 via pipe 82. Valve 80 functions to maintain a minimum oil flow rate through the column, regardless of variations in wet oil input flow rate. The rate of flow of oil through the pipe 74 from the filter regulates the position of a poppet in valve 80, thereby controlling the filtered dry oil flow from line 72 through valve 80 and line 82. If the rate of oil flow in line 74 is below a predetermined minimum rate, the filtered dry oil flow from line 72 which flows into line 82 is cut off entirely, and the filtered dry oil from line 72 flows into line 77 and back to the column, thereby maintaining a minimum oil flow rate through the column.

Figure 4:
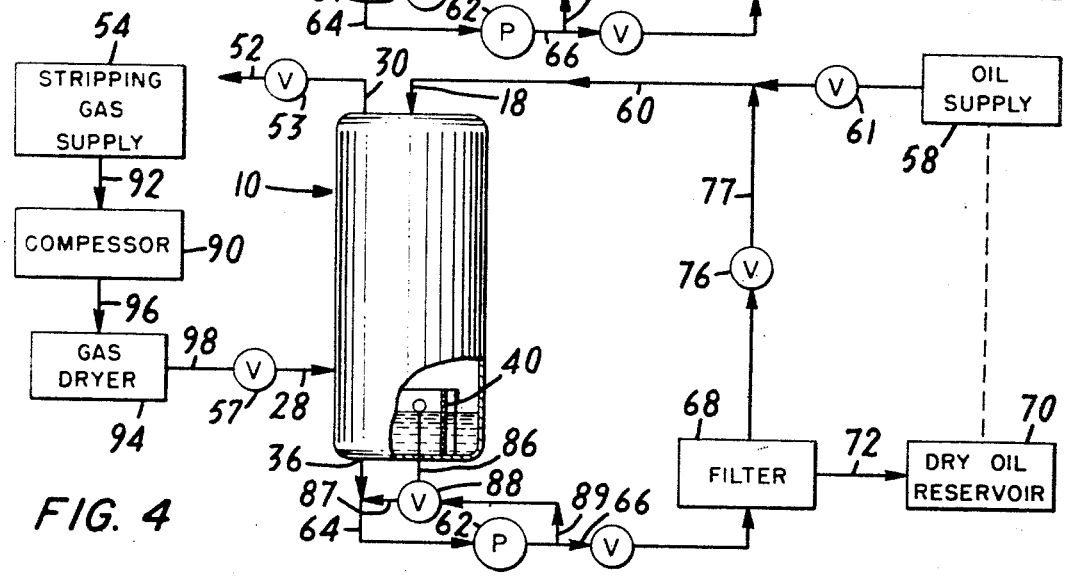
FIGURE 4 is a schematic drawing of still another preferred embodiment of the invention incorporating a stripper column similar to that shown in FIGURE 1 and containing a compressor and gas dryer to lower the partial pressure of water in the stripping gas.

FIGURE 4 represents another modification of FIGURE 2 wherein the stripping gas supply 54 is connected to a compressor 90 via pipe 92, the compressor to a gas dryer 94 via pipe 96, and the dryer 94 to gas inlet 28 via pipe 98. The vacuum pump is eliminated from the embodiment illustrated in FIGURE 4. The compressor and dryer function to prepare the stripping gas for subsequent use by lowering the partial pressure of water vapor contained in the gas.

The operation of the apparatus shown in FIGURES 3 and 4 is essentially the same as in the apparatus of FIGURE 2 described hereinbefore. Further, the modifications relating to the control of rate of oil flow into and out of the column shown in FIGURE 3 can easily be incorporated into the embodiment of FIGURE 4.

Example 1

Apparatus was assembled as shown in FIGURE 4. The stripper column used was of the type shown in FIGURE 1 containing a stripping zone 6 inches in diameter and about 36 inches in height, packed with Tellerette plastic springs or helices having about 1 inch diameter. About 10 gallons of MIL606 hydraulic oil at about 95° F., having a viscosity of about 12 cp., containing about 10,000 p.p.m. of water, of which about 100 p.p.m. was dissolved in the oil, was passed into the upper portion of the stripper column at a rate of about 4 gallons per minute (g.p.m.), or about 0.53 cubic feet per minute, and thereafter was fed, in the form of a plurality of oil streams, into the stripping zone of the column. The down-flowing oil streams were disrupted, broken up and spread out into thin films of oil by the Tellerette plastic helices. The oil films were continually disrupted by the packing, and thereafter reformed.

Atmospheric air having a relative humidity of about 40%, a dew point temperature of about 2° F. and a partial pressure of water vapor of about 7.5 mm. Hg was compressed and was thereafter passed through a 10H type dryer manufactured by Pall-Trinity Micro Corporation, thereby reducing its dew point temperature of about −90° F., and its partial pressure of water vapor to about 0.00007 mm. Hg. The dried air was then passed at a rate of about 10 standard cubic feet per minute (s.c.f.m.) (or about 50 cubic feet per minute per square foot of tower cross section) into a lower portion of the stripper column. The ratio of the $$\frac{\text{flow rate of air}}{\text{flow rate of oil}}$$

was about 18.9. The air was passed countercurrently through the thin oil films, thereby disrupting and breaking up said films and causing water dispersed and dissolved in the oil to vaporize can be sorbed by the air. The oil was then filtered using a filter in accordance with U.S. Patent No. 3,246,767, Ser. No. 215,151, filed Aug. 6, 1962. The filtered oil was repeatedly recycled through the column for about 12 hours, and the water content then measured, and found to be reduced to about 20 p.p.m.

Thus, it is seen that by use of the instant invention, the water content in the oil was reduced to about 0.2% of its initial content, and that all dispersed water and substantially all dissolved water was removed from the oil.

Example 2

Apparatus was assembled as shown in FIGURE 2. The stripper column was the same as that used in Example 1. A Welch Laboratory type vacuum pump connected to the gas outlet of the column was used to reduce the pressure in the column to about 670 to 700 mm. Hg. about 8 gallons of Texaco 55 transformer oil, at about 95° F., having a viscosity of about 10 cp., containing about 10,000 p.p.m. of water, of which about 15 p.p.m. was dissolved in the oil, was passed into the upper portion of the column at a rate of about 3 to 4 g.p.m. or about 0.40 to 0.53 cubic feet per minute.

Ambient air initially having a relative humidity of about 65%, a dew point temperature of about 60° F. and a partial pressure of water of about 13 mm. Hg., was passed at a rate of 1 s.c.f.m. into the lower portion of the column through a valve adjusted to produce a pressure of 1.5 p.s.i.a. in the lower chamber, thereby reducing its dew point temperature to about 14.5° F. and its partial pressure of water to about 1.3 mm. Hg., and increasing the flow to 10 c.f.m. or about 50 cubic feet per square foot of tower cross section. The ratio of the $$\frac{\text{flow rate of air}}{\text{flow rate of oil}}$$

was thus within the range from about 19 to about 25. The oil was then dehydrated in the column and filtered, as described in Example 1. After recycling the filtered oil through the column for about 12 hours, the water content in the oil was found to be reduced to about 20 to 30 p.p.m. Thus, all of the dispersed water and substantially all dissolved water was removed.

Having regard to the foregoing disclosure, the following is claimed as the inventive and patentable embodiments thereof:

1. A method of removing substantially all water admixed in a quantity of oil which comprises distributing the mixture of oil and water in a column of packing material to form a plurality of thin films on said packing material, so as to greatly increase the surface area of the mixture, passing countercurrently over the films on said packing material a stripping gas in which any water vapor therein has a partial pressure that is less than the pressure at which the water vaporizes from the oil and water mixture, at a flow rate of at least about 2.5 cubic feet per minute per square foot of cross section of the column of packing material, said flow rate being instrumental in disrupting and reforming the thin films on the packing material, and said stripping gas thereby taking up the water both dispersed and dissolved in the oil; and recovering the dehydrated oil.

2. A method in accordance with claim 1 wherein the oil and water mixture is introduced into the column of packing material in at least one relatively thick heavy stream under a head of pressure sufficient to resist disruption against the countercurrent flow of the stripping gas.

3. A method in accordance with claim 1 wherein the stripping gas is air.

4. A method in accordance with claim 1 including, in addition, the step of filtering the oil after dispersed and dissolved water has been removed therefrom.

5. A method in accordance with claim 1 including, in addition, the steps of purging the stripping gas of water and recycling the purged gas.

6. A method in accordance with claim 1 including, in addition, the step of heating the oil and water mixture to a temperature below the boiling point of the oil.

7. A method in accordance with claim 1 wherein the thin films have a thickness of less than about 0.060 inch.

8. A method in accordance with claim 1 wherein the ratio of the flow rate of stripping gas to the flow rate of the oil and water mixture is within the range from about 4 to about 100.

9. A method in accordance with claim 1 in which the stripping gas is at a pressure below atmospheric.

10. An apparatus for removing substantially all of a first liquid admixed in a second liquid less volatile than the first, adapted to allow the passage therethrough of gas at a high flow rate, which comprises, in combination, a stripper column; an inlet for the mixed first and second liquids and an outlet for the second liquid in the column; a stripping zone within the column; means to feed the mixed first and second liquids into the stripping zone; packing material in the stripping zone containing at least 50 square feet of surface area per cubic foot of packing, at least 10,000 interstitial holdup points per cubic foot of packing, and at least about 50% open area and said packing material having a diameter which is in a ratio to the diameter of the column within the range from about $\frac{1}{64}$ to about $\frac{1}{4}$, to allow the passage of gas at a flow rate of at east about 2.5 cubic feet per minute per square foot of cross section of stripper column therethrough; and a stripping agent inlet and a stripping agent outlet for the column.

11. An apparatus in accordance with claim 10 wherein said means is adapted to introduce said mixed liquids in at least one thick, heavy stream under a head of pressure sufficient to resist disruption against a countercurrent flow of stripping gas flowing at a rate of at least about 2.5 cubic feet per minute per square foot of cross section of stripper column.

12. An apparatus in accordance with claim 11, wherein said means comprises a container having a bottom containing a plurality of holes, each hole being fitted with an overflow tube, for forming a plurality of streams of liquid supplied from the container via the tubes, said container defining a reservoir above the tubes so as to create a head of pressure in the liquid delivered via the tubes.

13. An apparatus in accordance with claim 10 including a plurality of disc-shaped annuluses, serving as baffles in the column, each annulus being attached to the inner walls of the column and extending downwardly and away from said inner walls, to direct the thin films of mixed liquids in the stripping zone away from the inner walls of the stripper column and into the central portion of the stripping zone, each annulus having a span from the outer wall to the central opening within the range from about 0.18 to about 0.61 times the square root of the diameter of the column in inches, each annulus being spaced in a ratio to the diameter of the column of from about 1:1 to about 3:1.

14. An apparatus in accordance with claim 10 including means to substantially uniformly distribute stripping gas in the stripping zone, comprising an annular trough, the outer periphery of which is positioned above the gas inlet and adjacent to the inner walls of the stripper column, and the inner periphery of which extends below the gas inlet and at a distance from the inner walls of the stripper column within the range from about 0.01 to about 0.06 times the diameter of the column.

15. An apparatus in accordance with claim 14 wherein the annular trough has a U-shaped cross section, the legs of which extend downwardly, and the height of such legs is within the range from about 0.04 to about 0.2 times the diameter of the column, and the distance between the legs is within the range from about 0.01 to about 0.06 times the diameter of the column, and has a central opening within the range from about 0.8 to about 0.98 times the diameter of the column.

16. An apparatus for removing substantially all of a first liquid admixed in a second liquid less volatile than the first, which comprises, in combination, a stripper column; an inlet for the mixed first and second liquids and an outlet for the second liquid in the column; a stripping zone within the column; means to feed the mixed first and second liquids into the stripping zone in the form of at least one thick, heavy stream under a head of pressure sufficient to resist disruption against a countercurrent flow of stripping gas; packing material in the stripping zone containing at least 80 square feet of surface area per cubic foot of packing, at least 30,000 interstitial holdup points per cubic foot of packing and at least about 90% open area, and having a diameter which in a ratio to the diameter of the column within the range from about $\frac{1}{64}$ to about $\frac{1}{6}$, spreading out the liquid stream into a plurality of thin films; means to direct the thin films of mixed liquids in the stripping column away from the inner walls of the stripping column and into the central portion of the stripping zone; a stripping gas inlet and a stripping gas outlet for the column; and means to substantially uniformly distribute stripping gas in the stripping zone in the form of an annular ring having an inverted U-shaped cross section.

References Cited

UNITED STATES PATENTS

| | | | |
|---|---|---|---|
| 1,002,570 | 9/1911 | Dubbs | 208—187 |
| 1,597,700 | 8/1926 | Walker | 252—329 |
| 1,971,379 | 8/1934 | Pearce | 208—185 |
| 2,047,157 | 7/1936 | Rodman et al. | 208—185 |
| 2,072,382 | 3/1937 | Robinson | 261—97 |
| 2,076,498 | 4/1937 | Farwell | 208—187 |
| 2,632,638 | 3/1953 | Turner | 261—97 |
| 2,639,130 | 5/1953 | Heere | 261—97 |
| 2,754,096 | 7/1956 | Welty | 261—97 |
| 3,099,697 | 7/1963 | Lerman et al. | 261—97 |
| 2,867,425 | 1/1959 | Teller | 261—95 |
| 3,273,872 | 9/1966 | Eckert | 261—97 |
| 3,350,075 | 10/1967 | Douglass | 261—95 |

OTHER REFERENCES

"Support Plates and Distributors for Packed Columns," The U.S. Stoneware Co. (1957) pp. 2–21.

DELBERT E. GANTZ, *Primary Examiner.*

G. J. CRASANAKIS, *Assistant Examiner.*

U.S. Cl. X.R.

261—96, 97, 98

PO-1050
(5/69)

UNITED STATES PATENT OFFICE
CERTIFICATE OF CORRECTION

Patent No. 3,448,038            Dated June 3, 1969

Inventor(s) D. B. Pall et al.

It is certified that error appears in the above-identified patent and that said Letters Patent are hereby corrected as shown below:

Column 2, line 44, "hte" should read --the--.

Column 3, line 24, "forh" should read --form--.

Column 4, line 20, "of" should read --or--.

Column 4, line 29, "or" should read --of--.

Column 6, line 55, "1.1" should read --1:1--.

Column 7, line 63, "swiltch" should read --switch--.

Column 11, line 54, "MIL606" should read --MIL5606--.

Column 11, line 72, "of about" should read --to about--.

Column 13, line 39, (claim 10), "east" should read --least--.

Column 14, line 33, (claim 16), following the word "which", please insert --is--.

Column 14, line 38, (claim 16), "stripping" should read --stripper-

SIGNED AND
SEALED
MAR 24 1970

(SEAL)
Attest:

Edward M. Fletcher, Jr.
Attesting Officer

WILLIAM E. SCHUYLER, JR.
Commissioner of Patents